US00RE49505E

(19) United States
(12) Reissued Patent
Trantow

(10) Patent Number: US RE49,505 E
(45) Date of Reissued Patent: Apr. 25, 2023

(54) SERVICING DEVICE AGGREGATES

(71) Applicant: Intel Corporation, Santa Clara, CA (US)

(72) Inventor: Wayne D. Trantow, Portland, OR (US)

(73) Assignee: INTEL CORPORATION, Santa Clara, CA (US)

(21) Appl. No.: 14/594,752

(22) Filed: Jan. 12, 2015

Related U.S. Patent Documents

Reissue of:
(64) Patent No.: 8,356,067
Issued: Jan. 15, 2013
Appl. No.: 10/280,889
Filed: Oct. 24, 2002

(51) Int. Cl.
*G06F 15/16* (2006.01)
*G06F 9/50* (2006.01)

(52) U.S. Cl.
CPC ..... *G06F 9/5061* (2013.01); *G06F 9/5055* (2013.01); *G06F 9/5072* (2013.01)

(58) Field of Classification Search
CPC .... G06F 9/4415; G06F 9/4413; G06F 9/4411; G06F 9/4401; G06F 9/44; G06F 9/06; G06F 9/5027; G06F 9/5055; H01L 27/0262; H04L 61/2582; H04L 61/256; H04L 61/2503; H04L 61/25; H04L 61/00; H04L 29/12547; H04L 29/1249; H04L 29/12339; H04L 29/1233; H04L 29/12009; H04L 29/12; H04L 41/0268; H04L 67/16
See application file for complete search history.

(56) References Cited

U.S. PATENT DOCUMENTS 3,226,675 A * 12/1965 Edwards ..... 340/467
5,826,239 A * 10/1998 Du ..... G06Q 10/06316 705/7.26
5,941,947 A * 8/1999 Brown et al. ..... 709/225
6,038,625 A * 3/2000 Ogino ..... H04L 12/40058 710/10
6,160,796 A * 12/2000 Zou ..... H04L 12/2805 370/257

(Continued)

FOREIGN PATENT DOCUMENTS

CN 1267421 9/2000
CN 1319800 10/2001
WO WO-98/59478 12/1998

OTHER PUBLICATIONS

1st Office Action, Chinese Application No. CPEL0352717, dated Sep. 30, 2005, 9 pages.

(Continued)

*Primary Examiner* — David E England
(74) *Attorney, Agent, or Firm* — Hanley, Flight & Zimmerman, LLC

(57) ABSTRACT

A constellation is determined in reference to a particular combination of devices and/or software, some or all of which may be coupled with a network. A constellation addresses aggregate capabilities provided by a combination of devices and/or software available on the network. The network may define multiple constellations. Services are written for constellations, and the services may be pulled from external sources for use on the network. A server on the network, such as a service host, may coordinate and manage obtaining services from the external sources, and removing or disabling services for constellations no longer valid.

173 Claims, 4 Drawing Sheets

(56) References Cited

U.S. PATENT DOCUMENTS 6,185,491 B1 2/2001 Gray et al.
6,363,417 B1 3/2002 Howard et al.
6,363,434 B1 * 3/2002 Eytchison ..... H04L 12/40058 375/E7.019
6,377,860 B1 4/2002 Gray et al.
6,437,692 B1 8/2002 Petite et al.
6,452,935 B1 * 9/2002 Gibbs ..... H04L 12/2805 370/437
6,460,082 B1 * 10/2002 Lumelsky ..... G06F 9/50 709/226
6,542,474 B1 * 4/2003 Lau ..... H04L 12/2803 370/257
6,571,297 B1 5/2003 Cline et al.
6,580,950 B1 6/2003 Johnson et al.
6,618,764 B1 * 9/2003 Shteyn ..... H04L 12/2803 709/249
6,636,505 B1 * 10/2003 Wang ..... H04L 12/2856 370/254
6,735,630 B1 5/2004 Gelvin et al.
6,826,607 B1 11/2004 Gelvin et al.
6,832,251 B1 12/2004 Gelvin et al.
6,859,831 B1 2/2005 Gelvin et al.
6,889,188 B2 * 5/2005 Metzler ..... G10L 15/22 704/270
6,892,230 B1 5/2005 Gu et al.
6,916,247 B2 * 7/2005 Gatto et al. ..... 463/42
6,948,168 B1 9/2005 Kuprionas
6,961,941 B1 * 11/2005 Nelson ..... G06F 9/45533 719/310
6,963,784 B1 11/2005 Gibbs
6,973,473 B1 * 12/2005 Novaes ..... G06F 9/465 370/389
6,985,939 B2 1/2006 Fletcher et al.
6,990,379 B2 * 1/2006 Gonzales ..... H04L 12/2803 340/3.1
7,020,701 B1 3/2006 Gelvin et al.
7,039,701 B2 * 5/2006 Wesley ..... H04L 29/06 709/224
7,069,318 B2 * 6/2006 Burbeck ..... H04L 29/12009 709/203
7,072,960 B2 * 7/2006 Graupner ..... G06F 9/5066 709/223
7,143,139 B2 * 11/2006 Burbeck ..... H04L 12/1863 709/206
7,159,007 B2 1/2007 Stawikowski
7,167,920 B2 * 1/2007 Traversat ..... G06F 9/4416 707/999.009
7,171,471 B1 * 1/2007 Nair ..... H04L 67/16 707/999.01
7,177,929 B2 * 2/2007 Burbeck ..... H04L 29/12009 709/200
7,181,536 B2 * 2/2007 Burbeck ..... H04L 29/12009 709/223
7,185,342 B1 2/2007 Carrer et al.
7,206,934 B2 * 4/2007 Pabla ..... H04L 63/02 709/226
7,207,041 B2 4/2007 Elson et al.
7,251,689 B2 * 7/2007 Wesley ..... H04L 29/06 709/200
7,263,560 B2 * 8/2007 Abdelaziz ..... H04L 61/3065 709/228
7,283,811 B2 10/2007 Gidron et al.
7,325,047 B2 * 1/2008 Brittenham ..... G06F 9/5027 709/220
7,343,428 B2 3/2008 Fletcher et al.
7,386,860 B2 * 6/2008 Dani ..... H04L 67/02 719/315
7,412,538 B1 * 8/2008 Eytchison ..... H04L 12/2809 709/245
7,426,730 B2 * 9/2008 Mathews ..... G06Q 30/06 709/201
7,472,349 B1 * 12/2008 Srivastava ..... G06F 9/44
7,519,918 B2 * 4/2009 Trantow ..... G06F 1/1626 715/778
7,599,827 B2 * 10/2009 Hardwick ..... G06F 9/5011 703/22
7,603,469 B2 * 10/2009 Fletcher ..... H04L 29/06 709/201
7,797,367 B1 9/2010 Gelvin et al.
7,822,860 B2 10/2010 Brown et al.
7,844,687 B1 11/2010 Gelvin et al.
7,933,945 B2 4/2011 Krzyzanowski et al.
8,140,658 B1 3/2012 Gelvin et al.
8,356,067 B2 * 1/2013 Trantow ..... G06F 9/5072 709/203
2002/0062417 A1 * 5/2002 Rudland ..... H04L 29/12113 710/306
2002/0078259 A1 * 6/2002 Wendorf ..... H04L 67/2823 719/328
2002/0083143 A1 * 6/2002 Cheng ..... H04L 29/06 709/208
2002/0112058 A1 * 8/2002 Weisman ..... G06F 9/4411 709/227
2002/0143819 A1 * 10/2002 Han et al. ..... 707/513
2003/0005090 A1 1/2003 Sullivan, Jr. et al.
2003/0005130 A1 * 1/2003 Cheng ..... H04L 67/14 709/228
2003/0036917 A1 * 2/2003 Hite ..... G06F 9/548 706/48
2003/0055624 A1 * 3/2003 Fletcher ..... G06Q 30/06 704/2
2003/0061256 A1 * 3/2003 Mathews ..... G06Q 30/06 718/101
2003/0065756 A1 * 4/2003 Carrez ..... 709/221
2003/0084156 A1 * 5/2003 Graupner ..... G06F 9/5088 709/226
2003/0110334 A1 * 6/2003 Lanigan ..... H04L 12/4625 710/72
2003/0163513 A1 * 8/2003 Schaeck ..... H04L 29/06 709/201
2003/0182394 A1 * 9/2003 Ryngler ..... H04W 4/029 709/217
2003/0191802 A1 * 10/2003 Zhao ..... G06F 16/9574 709/203
2003/0217139 A1 * 11/2003 Burbeck ..... H04L 61/20 709/224
2003/0229900 A1 * 12/2003 Reisman ..... H04N 21/42204 725/87
2004/0003033 A1 * 1/2004 Kamen et al. ..... 709/203
2004/0030740 A1 * 2/2004 Stelting ..... 709/201
2004/0221001 A1 * 11/2004 Anagol-Subbarao et al. ..... 709/203
2004/0268407 A1 * 12/2004 Sparrell ..... H04N 21/43632 725/116
2005/0108354 A1 * 5/2005 Lisitsa ..... G06F 3/038 709/212

OTHER PUBLICATIONS

2nd Office Action, Chinese Application No. CPEL0352717, dated Jul. 11, 2007, 7 pages.
State Intellectual Property Office P.R. China, "Notification to Grant Patent Right for Invention," issued in connection with Chinese Application No. 03159735.1, dated Apr. 27, 2011, 4 pages.
State Intellectual Property Office P.R. China, "Third Office Action," issued in connection with Chinese Application No. 03159735.1, dated Mar. 14, 2008, 10 pages.
State Intellectual Property Office P.R. China, "Decision on Rejection," issued in connection with Chinese Application No. 03159735.1, dated Mar. 27, 2009, 5 pages.

* cited by examiner

FIG. 2 (AMENDED)
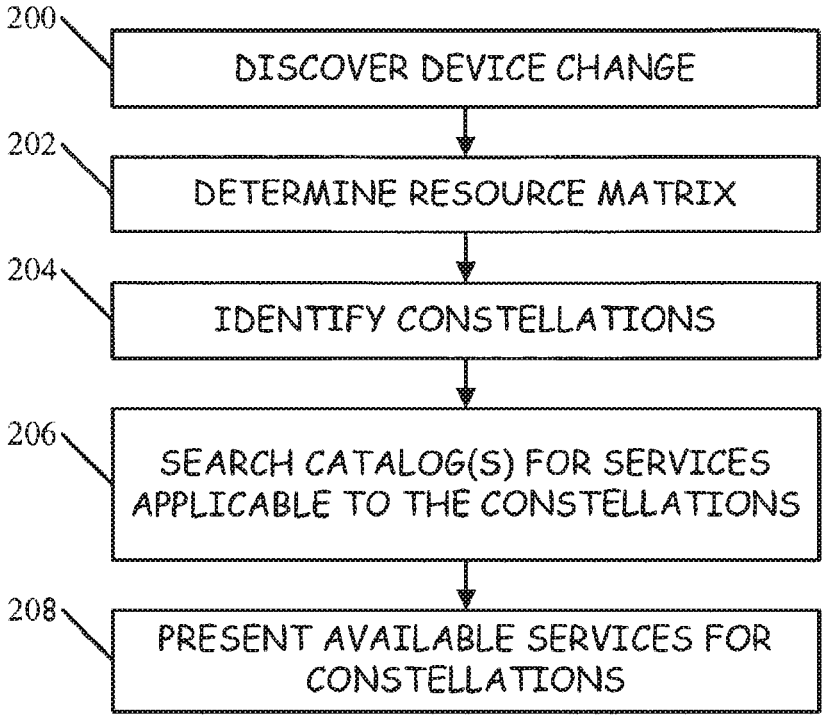

SERVICING DEVICE AGGREGATES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a broadening reissue of U.S. Pat. No. 8,356,067, issued Jan. 15, 2013, which is incorporated herein by reference.*

FIELD OF THE INVENTION

The invention generally relates to providing services to devices, and more particularly to aggregating installed devices to define a virtual device, which may then be provisioned according to the capabilities of the virtual device.

BACKGROUND

Generally, when a device is purchased, such as a computer, audio player, Compact Disc (CD) recorder, etc., certain drivers and/or software is provided to utilize the device. Historically, there has been no way to automatically make use of the combined potential of multiple devices within a particular environment. For example, a user may have, over time, purchased a computer for word processing, a speaker system incident to a game purchase, and a microphone incident to a dictation software purchase. Each of these devices was purchased for a particular purpose, and their associated software is designed for a specific use towards that purpose. However, in theory, these devices, in combination, may be used to implement other devices, such as an Internet telephone, answering system, etc.

Recently, some effort has been made to aggregate existing hardware to present a new device, such as the Internet telephone. Various technologies and protocols are being studied in an effort to build a framework in which such device combinations may be described. For example, the Web Services Description Language (WSDL) may be used to describe service capabilities; Universal Description, Discovery and Integration (UDDI) may be used to enable discovery of networked machines providing certain services (e.g., a services "yellow pages"), Universal Plug and Play (UPNP) may be used to enable identification and facilitate installation of devices attached to a network, etc.

Two particular well-known provisioning services, which may use UPNP or another web service description environment, includes the CableHome™ framework and the Open Service Gateway Initiative (OSGi), both of which are interface specifications defining delivery of services over wide-area networks (WANs) to local area networks (LANs) and devices on the LAN. Unfortunately, while allowing for providing an Internet telephone device as an aggregate of other devices on a LAN, these provisioning services lack flexibility in their ability to provision devices. These services restrict a user on a LAN, such as one connected to the Internet by way of a broadband connection such as a cable modem, XDSL (digital subscriber line) modem, etc., by not involving the user in the provisioning of services that may be applicable to the particular LAN devices. Instead, these provisioning services implement a supervised service "push" framework in which a technician affiliated with the provisioning service is responsible for identifying aggregate abilities that may exist on a LAN, and then pushing/offering services (perhaps exclusively) accordingly.

BRIEF DESCRIPTION OF THE DRAWINGS

The features and advantages of the present invention will become apparent from the following detailed description of the present invention in which:

FIG. 2 illustrates a flowchart of exemplary operations for managing devices communicatively coupled to a network.

DETAILED DESCRIPTION

Figure 1:
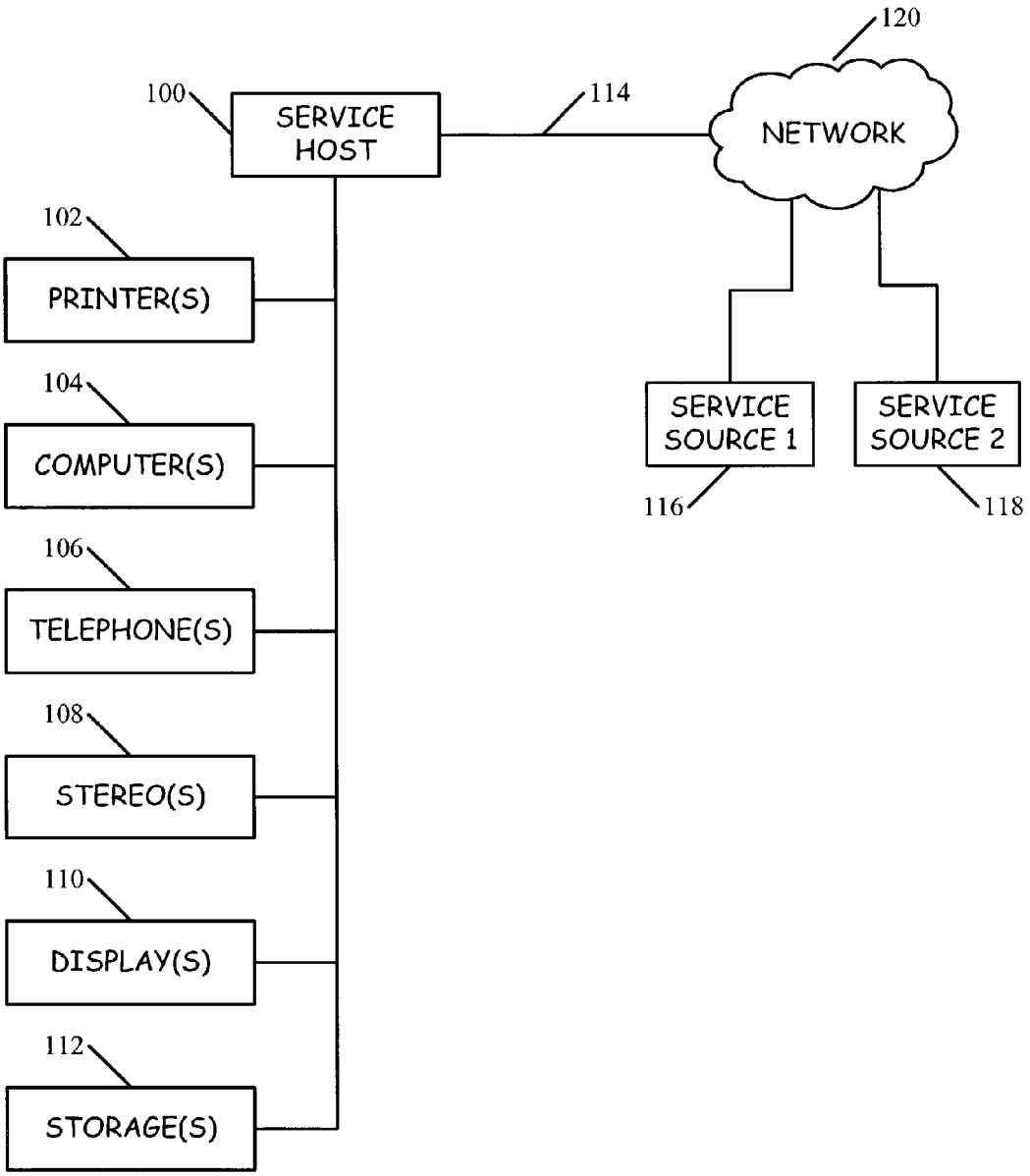
FIG. 1 illustrates an environment in which certain aspects of the invention may be performed.

In the following detailed description, numerous details are set forth in order to provide a thorough understanding of the present disclosed subject matter. However, it will be understood by those skilled in the art that the disclosed subject matter may be practiced without these specific details. In other instances, well-known methods, procedures, components, and circuits have not been described in detail so as not to obscure the disclosed subject matter.

A local environment including a network, such as a Local Area Network (LAN), may define a "resource matrix" comprised of web services and devices communicatively coupled in some manner, e.g., wired or wirelessly, to the network. A particular combination of devices and services constitutes a logical platform referenced herein as a resource "constellation." A "service" is defined as an operation performed by a service host in conjunction with a resource constellation. The operation of the service is defined by a software program that is packaged and made available to the service host by the service source. A service may provide an interface, resources, etc. and thus become a resource within a constellation for another service, e.g., a service may be built on an aggregation of other services, devices, etc.

As devices, machines, or services are added to the network, new services may be automatically obtained for constellations now definable with respect to the current state of the network. It is assumed that devices are either directly connectable to the network, or may be operated through an interface device. Thus, as one example, if a network environment already included an Internet link, a computer, and speaker system, and then a microphone were later added, this addition would allow defining a constellation which supports an Internet telephone service. Or, as another example, if a networked compact disc (CD) player were added, a constellation supporting a music jukebox service could be implemented.

Traditional service provider environments, such as CableHome or OSGi, operate as a service-push system, where the service provider attempts to track the nature of the local environment and offer/push services accordingly. This is inefficient, and often the information is out of date since the push provider may not be aware of changes to a local environment, e.g., network device additions/deletions. In illustrated embodiments, instead a service-pull system is used where services are pre-written for interfaces of presumed constellations. A service may be automatically pulled to a local environment once a constellation exists with the required infrastructure for the service, e.g., necessary hardware and/or software to support the service. Addition or removal of devices, machines or software from a network can be tracked so that constellations can be defined, suspended, removed, or updated automatically. And, costs may be associated with services, and local rules or policies applied, to determine if and how services may be automatically or manually obtained and utilized in a particular environment. It will be appreciated that advertising may also be targeted to constellations, and that a push and/or pull model may be employed to obtain them. Advertising may be used to sponsor or otherwise support making services available.

For the purposes of the following description and claims, a "service host" refers to a machine, such as a local server on the network, from which services may be obtained, e.g., this machine hosts services which may be provided to devices on the network. It will be appreciated that a service host may dynamically, opportunistically, predictively, etc. obtain services, just links thereto (e.g., a Uniform Resource Locator (URL) or other reference), or some combination thereof, from a "service source," e.g., typically a source external to the network. In the context of a link to a service, access of the link results in the service being obtained from its service source.

FIG. 1 illustrates an environment in which certain aspects of the invention may be performed. Illustrated are various devices, such as a printer 102, computer 104, e.g., a desktop, notebook, personal digital assistant (PDA), etc., telephone 106, stereo 108, display 110, e.g., a television, monitor, projector, liquid crystal display (LCD), etc., and storage 112, e.g., a network accessible mass storage device such as a hard drive. The phrase "resource context" will be used to refer to devices coupled with the server. It will be appreciated that the illustrated devices are for exemplary purposes only and are not intended to limit the invention.

Devices 102-112 are communicatively coupled to a service host 100, e.g., a local or remote server, workstation, desktop computer, Internet gateway or other computing device or machine, by way of a communication channel 114 which may be a combination of wired and/or wireless communication technologies. The service host is coupled with a network 120, such as the Internet, a wide area network (WAN) or other network. As will be discussed further below, the service host is operative to monitor when devices, such as illustrated device 102-112, are added or removed from the communication channel 114. In one embodiment, a service host determines what constellations are defined by available devices. It is assumed software, application programs, drivers, etc. (hereafter "software") have been prepared for presumed constellations, and the service host implements a supervisory pull system in which the service host automatically obtains software for constellations actually present in a resource context.

The service host 100 may be communicatively coupled with service sources 116, 118 which provide the software for various constellations. Although only two service [hosts] *sources* are illustrated, it will be appreciated that an arbitrary number of service [hosts] *sources* may be utilized. Service host 100 may be pre-configured with the identity of the service [hosts] *sources*, or a discovery protocol, such as UDDI, may be used to discover their presence.

It will be appreciated that constellation determination may be a resource and communication bandwidth intensive task beyond the capabilities of the service host 100 and/or its local network 114. Consequently, in another embodiment, a service source (or other external resource), such as one of the illustrated service [hosts] *sources* 116, 118, is responsible for comparing a resource matrix against available services provided by various service sources. In a still further embodiment, to facilitate the comparing, the service source maintains a "catalog" of available services, e.g., in a database, and performs an intersection of the catalog against the resource matrix to identify applicable services.

FIG. 2 illustrates a flowchart of exemplary operations for managing devices communicatively coupled to a network. In one embodiment, the illustrated operations may be performed by a FIG. 1 service host 100. In another embodiment, resource intensive tasks are offloaded to a high-performance device (or even to servers in a peer-to-peer network).

The service host may be configured to perform the illustrated operations continuously, or periodically. When the service host discovers 200 a device change, e.g., such as a power-up event or addition of a device to a resource context, the service host determines 202 a new resource matrix. It will be appreciated that resource matrices may be identified incrementally and retained, such that adding a new device results in identifying only the newly defined matrices.

After determining 202 the new resource matrix, constellations applicable to the resource matrix may be identified 204. It will be appreciated that with sufficient resources, one may skip the operation of identifying constellations, and simply map a resource context against all possible services to see which will operate in a given resource context.

A catalog may be searched 206 for software that is available for the constellations of the resource context. The catalog can be dynamically generated, such as through real-time queries to FIG. 1 service sources 116, 118, and/or the service host may advance query service sources for their service offerings and store results in a local storage, e.g., a database, etc., for later searching/matching. It will be appreciated the service host may catalog services for various constellations, including those not yet seen in a particular resource context. For example, common services, or popular services, may be predictively obtained in advance of an appropriate constellation being present.

In one embodiment, each available service may be presented [206] *208* to a user with an interface allowing inspection and/or selection of the service. It will be appreciated that the service may have access requirements, such as agreeing to licensing terms, arranging for payment for the software, or the like, and that the interface may be configured to prevent access to the software for the service until required terms are met. It will be appreciated that various cryptographic techniques may be employed to prevent tampering with software.

As noted above, resource intensive tasks, such as identifying 204 constellations, and [search] *searching* 206 catalogs for services, may be [are] offloaded to higher-performance devices that operate on behalf of the service host. For example, in a typical home environment, it is likely the service host will have inferior capabilities in comparison to a service source. Consequently, in one embodiment, a service source operates on behalf of a home network's service host to perform difficult tasks such as constellation identification and mapping against available services. The results of these intensive operations are provided to the service host.

Figure 3:
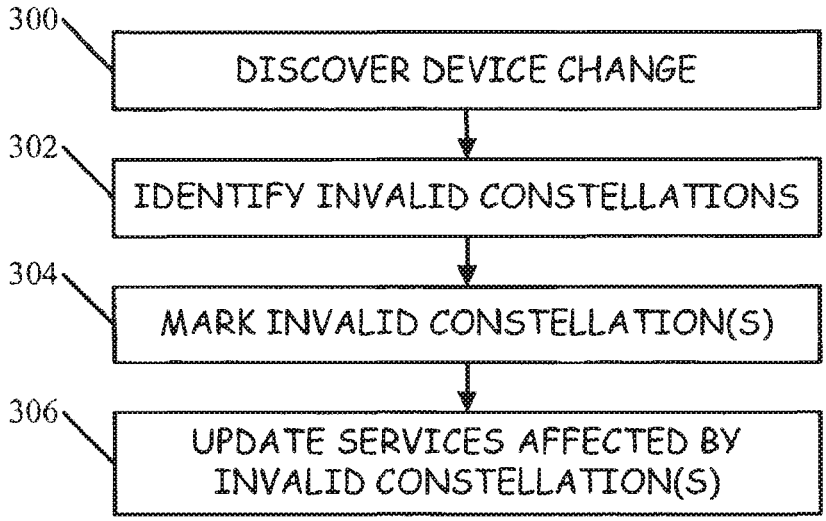
FIG. 3 illustrates a flowchart of exemplary operations performed by the FIG. 1 service host from which managed devices are decoupled.

FIG. 3 illustrates a flowchart of exemplary operations performed by the FIG. 1 service host 100 from which managed devices are decoupled. The service host may be configured to perform the illustrated operations continuously, or periodically, and may operate in conjunction with FIG. 2, or separately.

When the service host discovers 300 a device change, e.g., such as a power-down event or removal of a device from a resource context, currently known constellations for the resource context are inspected to determine 302 which contexts, if any, have been invalidated by the device removal. It will be appreciated that invalid contexts may be deleted from storage, or simply marked as unavailable.

Assuming an invalid constellation is marked 304 as being unavailable, the services associated with the now-invalid constellation are appropriately updated 306. For example, if a now-invalid service had a monthly fee, in one embodiment, the service host providing the service may be notified that charges should be suspended while the service is unavailable. Alternatively, updating 306 may be, or may include, displaying a dialog box or user-interface allowing a user to determine what action to take with respect to now-invalid services.

Figure 4:
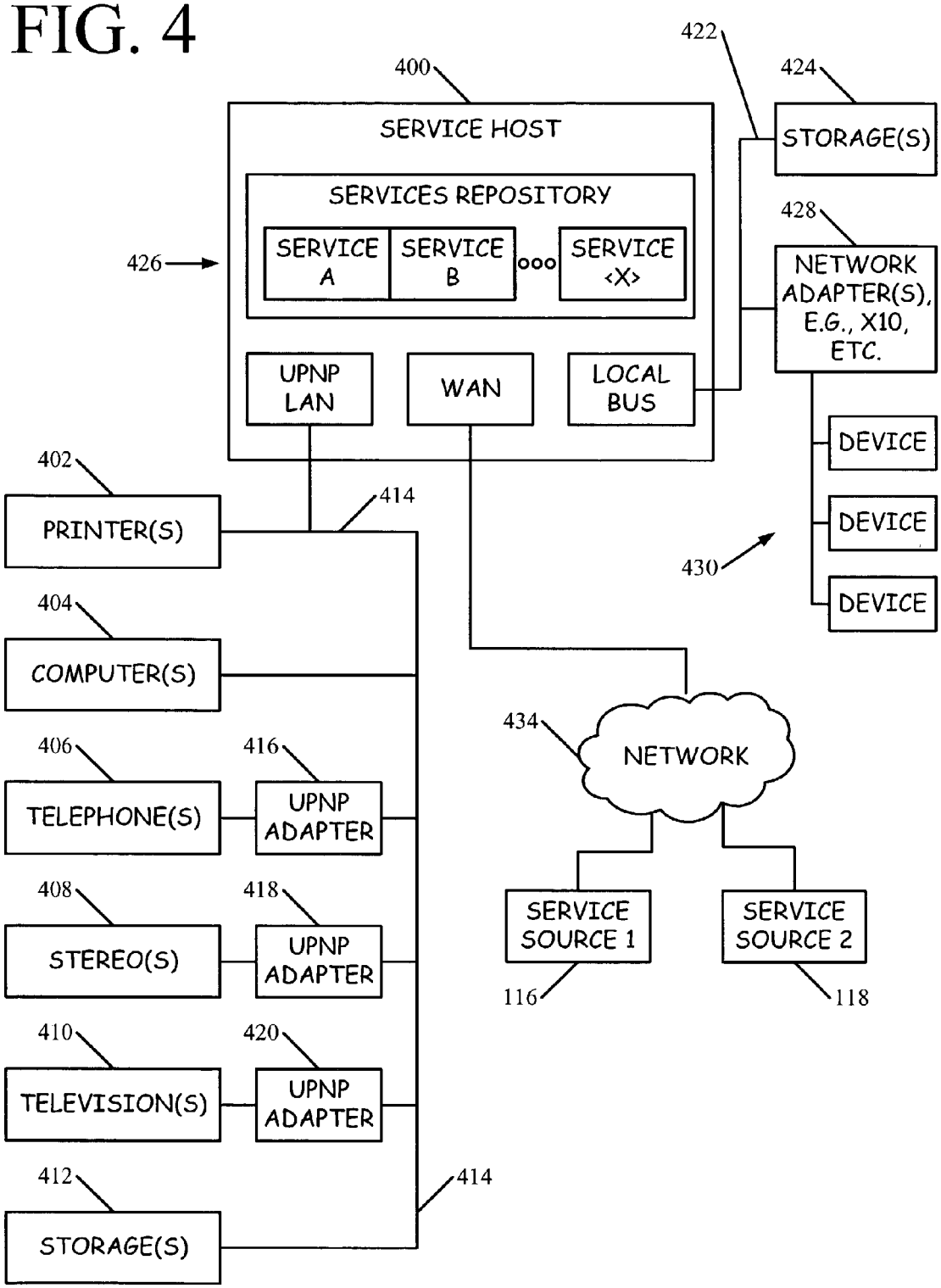
FIG. 4 illustrates a high-level view of a home network according to one embodiment.

FIG. 4 illustrates a high-level view of a home network according to one embodiment. The FIG. 4 embodiment is a detailed variation of the FIG. 1 embodiment. Illustrated are various devices, such as a printer 402, computer 404, telephone 406, stereo 408, television 410, and storage 412. It will be appreciated that the illustrated devices are for exemplary purposes only and are not intended to limit the invention.

Devices 402-412 are communicatively coupled to a service host 400 by way of a communication channel 414, which may be a combination of different wired and/or wireless communication technologies. In the illustrated embodiment, devices unable to directly communicate over the channel 414, such as telephone 406, stereo 408, television 410, etc., may be coupled to the channel by way of an adapter 416-420. In the illustrated embodiment, it is assumed that the communication channel 414 is a network, such as a Transmission Control Protocol/Internet Protocol (TCP/IP) based network, and that a discovery protocol, such as Universal Plug and Play (UPNP), is utilized to track addition and removal of devices from a hardware context. Thus, as illustrated, adapters 416-420 include UPNP adapters that identify the presence of, and integrate communication with, the devices in the resource context.

The service host may also have a local bus 422, e.g., a Universal Serial Bus (USB), Personal Computer Memory Card International Association (PCMCIA) or PC-CARD bus, or the like, to which may be attached devices (not illustrated) local to the service host. The local bus may also support attached storage 424, such as a large hard disk, for storing services 426 and related data. The local bus may also include local network adapters 428, such as specialized interfaces built-in to the service host to support communication with various types of devices 430, such as devices using the X10 protocol or equivalent operating over a power-line network, e.g., home electrical wiring.

The service host may be communicatively coupled, at least intermittently, to a network 434, such as the Internet, a wide area network (WAN), broadband network, or other network. In the illustrated embodiment, the service host 400 monitors UPNP events to identify when devices, such as illustrated devices 402-412, are added or removed from communication channel 414. In the illustrated embodiment, the service sources 116, 118 are configured to determine what constellations are defined by the current resource context, e.g., based on which devices are presently available. As discussed above, the service host may implement a supervisory pull system in which the service host automatically obtains from service sources 116, 118 drivers, software, etc. which may be contained within service packages for constellations applicable to the resource context. Acquired services, e.g., services 426, are associated with the service host for later use in various resource contexts.

To demonstrate exemplary operation of the illustrated embodiment, consider an end-user who had a UPNP IP Telephone Adapter 416, a UPNP Audio Adapter, 418, speakers operative in several rooms, and later added storage device 412, such as a UPNP Media Storage Sever or other device capable of being instructed by other UPNP devices to store and retrieve data when needed. The storage 412 and adapters 416, 418 correspond to one logical constellation defined in the context of the illustrated network. As discussed above, whenever a new device is added to the home network, the service host 400 discovers it and adds the device information the resource context. It will be appreciated that various database technology may be employed by the service host to track resource contexts.

When a user adds storage 412 to the home network, in one embodiment, the service host 400 makes a Web Service invocation to the service source, such as a Simple Object Access Protocol (SOAP) message with input arguments describing the resource matrix, which could include all the UPNP devices in the network, all Web Services the user subscribes to, configuration details of the service host, e.g., software libraries devices local to the service host, and other resources. It will be appreciated that various resource description languages may be used to describe the resource matrix. For example, RDF (Resource Description Framework), an XML-based framework for describing resources, could be used to describe the resource matrix, and be sent as a single XML document argument in the SOAP call. It will be appreciated that other document structures defined by a future XML Schema may be used, e.g., in accord with new document standards. It will also be appreciated that SOAP is identified for exemplary purposes only, and that other technologies may be used to transport a current resource context.

In one embodiment, also identified are services which may be used as resources for other services, e.g., to allow aggregating a service into another service. The Web Service function identified in the SOAP message is received by the service source (or another device acting as a broker for the home network), and when processed (e.g., executed, interpreted, etc.) results in the service source searching through all of the cataloged services of known service sources (e.g., services offered by service sources 116, 118. In one embodiment, the infrastructure between the service host and service sources is based upon Web Services, i.e., extensible Markup Language (XML) based technologies including WSDL, SOAP, and UDDI.

Published operating requirements of different services are compared against the resource context of the home network. It will be appreciated that there may be thousands of cataloged services located on many networked service sources. Matching resource contexts against potentially applicable services may be a resource intensive task. Thus, in one embodiment, specialized intermediaries (e.g., service cataloging agents or service brokers) offload matching operations of the service host. When a match is found, the service information is extracted and saved to a list. In one embodiment, only new or updated services are saved to the list. When all available services have been inspected, a SOAP response including the list may be returned to the service host. The service host may then notify a user of the available services through a user interface, such as by way of a web browser directed towards a web server of the service host, email, or other notification technique.

Thus, for example, the user may receive notification that a Telephone Answering Machine (TAM) service is available for a resource constellation comprised of the telephone 406, storage 412, which the service could use to store outgoing and incoming messages, and stereo 408 which the service could use to play received messages to the user. The user may choose a particular service based on various considerations, including price and performance considerations, as well as the nature of the equipment in the identified constellation. It will be appreciated that various techniques, including a conventional telephone call to a support center, or an online commerce transaction, may be used to allow the user to select a service and satisfy payment requirements or other requirements.

Assume the user is able to use a web browser to purchase the service, and then receive an authorization certificate. This certificate can be given to the service host along with an instruction to install the purchased service. If the software for the service has not already been obtained, the service host can download it from its service source. In one embodiment, the service host gives the certificate to the service source to prove authorization of the service host to obtain a copy of the software. The user now may use the acquired Telephone Answering Machine.

In one embodiment, a service, such as the TAM service, may provide multiple interfaces. For example, the TAM may provide a user interface for a user of the TAM, and a programmatic interface described by a WSDL. A service host could thus host a Web Service locally that other local services could access via local SOAP invocations, or over the WAN, e.g., the service host may operate as a service source for the TAM service. Thus, for example, an end-user could access the home TAM from work via an appropriate control program operating over the WAN.

Figure 5:
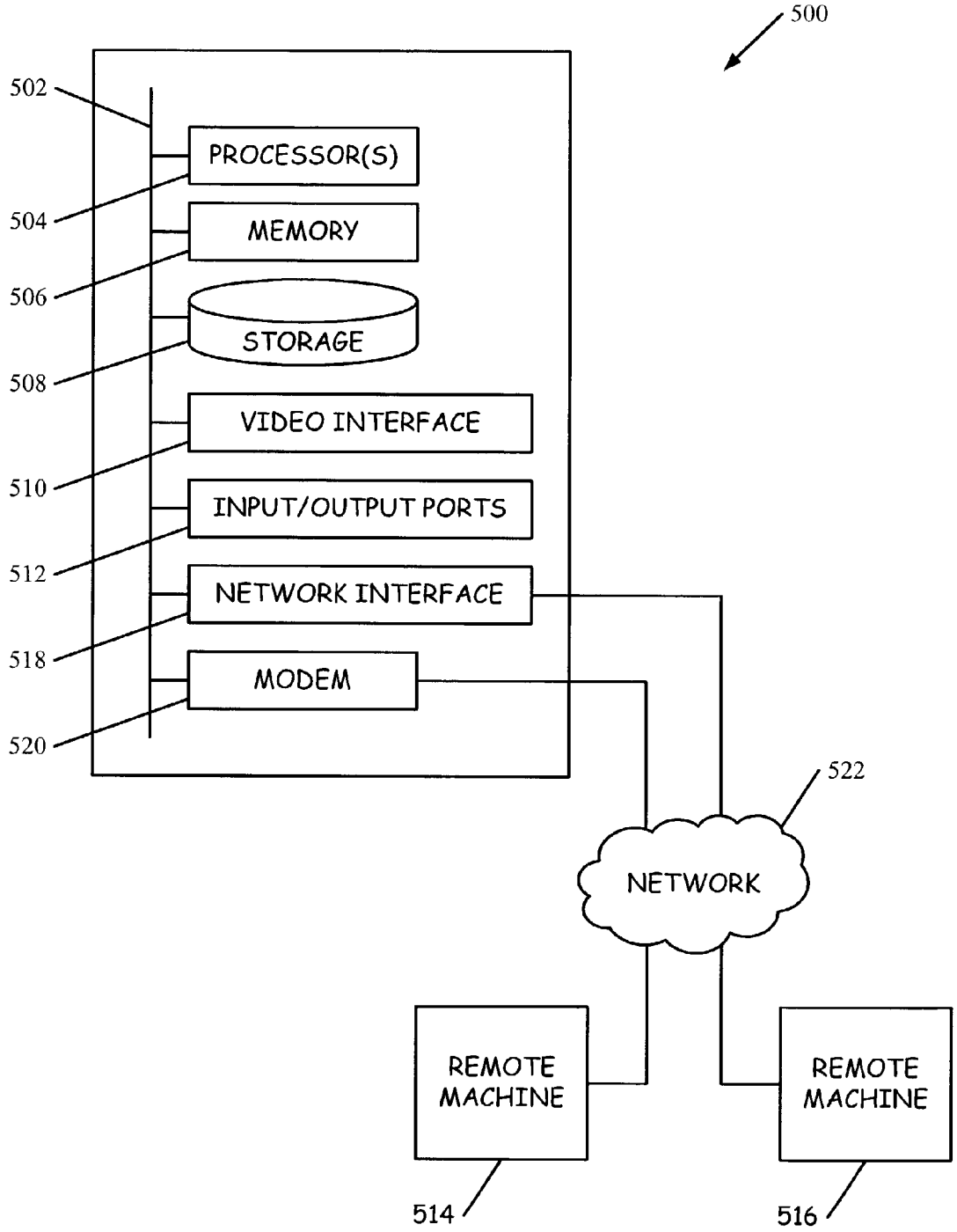
FIG. 5 illustrates a suitable computing environment in which certain aspects of the invention may be implemented.

FIG. 5 and the following discussion are intended to provide a brief, general description of a suitable machine in which certain aspects of the illustrated invention may be implemented. As used herein, the term "machine" includes a single machine, such as a computer, handheld device, transportation device, etc., or a system of communicatively coupled machines or devices.

Typically, a machine 500 includes a system bus 502 to which is attached processors 504, a memory 506, e.g., random access memory (RAM), read-only memory (ROM), or other state preserving medium, storage devices 508, a video interface 510, and input/output interface ports 512. The machine may be controlled, at least in part, by input from conventional input devices, such as keyboards, mice, etc., as well as by directives received from another machine, interaction with a virtual reality (VR) environment, biometric feedback, or other input source or signal.

The machine may include embedded controllers, such as programmable or non-programmable logic devices or arrays, Application Specific Integrated Circuits, embedded computers, smart cards, and the like. The machine may utilize connections to one or more remote machines 514, 516, such as through a network interface 518, modem 520, or other communicative coupling. Machines may be interconnected by way of a physical and/or logical network 522, such as the network 120 of FIG. 1. One skilled in the art will appreciate that network 522 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, volatile and/or non-volatile memory 506, or in storage devices 508 and their associated storage media, including hard-drives, floppy-disks, optical storage, tapes, flash memory, memory sticks, digital video disks, biological storage, etc. Associated data may be delivered over transmission environments, including network 522, in the form of packets, serial data, parallel data, propagated signals, etc., and may be used in a compressed or encrypted format. Associated data may be used in a distributed environment, and stored locally and/or remotely for access by single or multiprocessor machines, portable computers, handheld devices, e.g., Personal Digital Assistants (PDAs), cellular telephones, tablets, etc.

Thus, for example, with respect to the illustrated embodiments, assuming machine 500 embodies the service host 100 of FIG. 1, then remote machines 514, 516 may respectively be two service sources (see, e.g., FIG. 1 service sources 116, 118) providing services to the service host 100. It will be appreciated that remote machines 514, 516 may be configured like machine 500, and therefore include many or all of the elements discussed for machine. It will be appreciated that the service host may optionally be configured to operate as a service control proxy for local control devices on its network, such as handheld devices, where services may be viewed and executed by the local control devices even though they do not actually contain the service itself. That is, a local control device may operate as a front-end providing a convenient mobile user interface, while the service host operates as a back-end where services are actually hosted and managed.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method for a service source to provision resources communicatively coupled with a first *local area* network, said resources including devices or web services [associated with] *in* an environment, the method comprising:

receiving from a service host a resource context *identifying constellations of the resources* for the environment [constellation of resources] *in response to an addition of a first electronic device to the first local area network, different sets of the devices included in different constellations*;

accessing service descriptions of services offered by the service source as well as services offered by other service sources communicatively coupled with the service source;

mapping the [resource context] *constellations* against the accessed service descriptions to determine at least one service operable [on selected ones of the resources in the resource context, said selected ones corresponding to a constellation] *to aggregate a first function of the first electronic device and a second function of a second electronic device, the first and second electronic devices corresponding to at least one of the constellations*; and providing an identification of the at least one determined service to the service host *to facilitate provisioning of the first and second electronic devices in at least one of the at least one constellations to collectively perform an aggregated function utilizing the first and second functions of the first and second electronic devices in the first local area network, the aggregated function corresponding to a third device which is different from the first electronic device and different from the second electronic device*.

2. The method of claim 1, wherein the resource context is received over a second network different from the first *local area* network.

3. The method of claim 1, wherein the resource context is determined based at least in part on a monitoring of communicative couplings of machines to the *first local* network.

4. The method of claim 1, wherein *the* accessing *of the* service descriptions of *the* services offered by the service sources comprises:

cataloging, prior to receiving the resource context, services provided by the service sources.

5. The method of claim 1, wherein *the* accessing *of the* service descriptions of *the* services offered by the service [hosts] sources comprises:

cataloging services provided by the service sources.

6. The method of claim 1, further comprising:

responsive to receiving the resource context, querying a service catalog for descriptions of services currently offered by the service sources.

7. The method of claim 1, further comprising:

receiving a request to use the *at least one* determined service; and facilitating access to program code required to use the *at least one* determined service.

8. The method of claim 7, wherein *the* facilitating *of the* access to program code comprises a selected one of:

providing a Uniform Resource Locator (URL) to the program code; or providing a Web Service URI (Uniform Resource Identifier) for accessing and downloading the program code.

9. The method of claim 7, wherein *the* facilitating *of the* access to *the* program code comprises:

copying the program code from a storage containing the *at least one* determined service; and sending the program code to the service host.

10. The method of claim 1, further comprising:

charging the service host a fee associated with the determined service.

11. A non-transitory computer-readable storage medium [storing] *comprising stored* data [thereon] for a service source to provision resources communicatively coupled with a first network, said resources including devices or web services associated with an environment, wherein the data, when accessed, [results in] *causes* a machine [performing] *to*:

[receiving] *receive* from a service host a resource context [for] *to identify said devices of* the environment *in response to an addition of a first device to the first network*;

[accessing] *access* service descriptions of services offered by the service source as well as services offered by service cataloging agents or brokers representing sources communicatively coupled with the service source;

[mapping] *map* the resource context against the accessed service descriptions to determine at least one service operable [on] *to aggregate functions of* selected ones of the resources *including a first function of the first device and a second function of a second device*, said selected resources corresponding to a constellation *including the first device and the second device, the second function different from the first function, the selected resources to collectively implement an aggregated function utilizing the first and second functions of the first and second devices in the first network, the aggregated function corresponding to a third device which is different from the first device and different from the second device*; and

[providing] *provide* an identification of the at least one determined service to the [source] *service host*.

12. The non-transitory computer readable storage medium of claim 11 [further including data which] *wherein the data*, when accessed, [results in] *causes* the machine [performing] *to*:

[receiving] *receive* the resource context over a second network different from the first network.

13. The non-transitory computer readable storage medium of claim 11 [further including data which] *wherein the data*, when accessed, [results in] *causes* the machine [performing] *to*:

[determining] *determine* the resource context based at least in part on a monitoring of communicative couplings of machines to the *first* network.

14. The non-transitory computer readable storage medium of claim 11 wherein the data[for accessing], *when accessed, causes the machine to access the* service descriptions of services offered by the service sources [further includes data which, when accessed, results in the machine performing] *by*:

cataloging, prior to receiving the resource context, services provided by the service sources.

15. The non-transitory computer readable storage medium of claim 11 [further including] *wherein the* data[which], when accessed, [results in] *causes* the machine [performing] *to*:

[cataloging] *catalog* services provided by the service sources.

16. The non-transitory computer readable storage medium of claim 11 [further including] *wherein the* data[which], when accessed, [results in] *causes* the machine [performing] *to*:

responsive to receiving the resource context, [querying] *query* the service sources for descriptions of services currently offered by the service sources.

17. The non-transitory computer readable storage medium of claim 11 [further including] *wherein the* data[which], when accessed, [results in] *causes* the machine [performing] *to*:

[receiving] *receive* a request to use the *at least one* determined service; and

[facilitating] *facilitate* access to program code required to use the *at least one* determined service.

18. The non-transitory computer readable storage medium of claim 17, wherein the data[for facilitating access to the program further includes data which], when accessed, [results in] *causes* the machine [performing] *to facilitate access to the program code at least by*:

providing a Uniform Resource Locator (URL) to the program code.

19. The non-transitory computer readable storage medium of claim 11 [further including] *wherein the* data[which], when accessed, [results in] *causes* the machine [performing] *to*:

[charging] *charge* the source a fee associated with the *at least one* determined service.

*20. The method of claim 1, wherein the resource context includes at least one service and the at least one constellation includes at least one of the at least one service.*

*21. The non-transitory computer-readable storage medium of claim 11, wherein the resource context includes at least one additional service and the constellation includes at least one of the at least one additional service.*

*22. A non-transitory computer storage medium comprising instructions that, when executed by one or more processors, cause the one or more processors to at least:*

*obtain a resource context identified by a first device, the resource context corresponding to a plurality of electronic devices in a peer-to-peer network, different combinations of the electronic devices corresponding to different constellations, different constellations providing different logical platforms, at least one of the logical platforms including at least a first electronic device and a second electronic device, the first electronic device different than the second electronic device, the first electronic device having a first function, the second electronic device having a second function different than the first function, the resource context to be updated in response to at least one of:*

*an addition of a new device to the peer-to-peer network,*

*an addition of a new service to the peer-to-peer network,*

*a removal of an existing device from the electronic devices, or*

*a removal of an existing service from the peer-to-peer network;*

*access a plurality of service descriptions corresponding to the resource context, the plurality of service descriptions describing additional services at least one of which corresponds to an aggregated function which may be implemented by the at least one of the logical platforms;*

*store information identifying the at least one additional service, the at least one additional service is discoverable in response to a first request from a second device in the peer-to-peer network;*

*utilize a supervisory pull system to automatically obtain software to provision at least the first and second electronic devices in the at least one logical platform to implement the aggregated function in the peer-to-peer network, the aggregated function utilizing the first function and the second function, the aggregated function different from the first function and different from the second function, wherein the software defines services that are pre-written for interfaces of the resource context; and*

*wherein the first device and the second device are configurable as both:*

*(i) a service host within the peer-to-peer network, wherein the service host is operative as a local or remote server to monitor at least one communication channel communicatively coupling the devices to detect the at least one of: the addition of the new device, the addition of the new service, the removal of the existing device, or the removal of the existing service; and,*

*(ii) a peer device within the peer-to-peer network, wherein the peer device is operative as a local or remote server to monitor the at least one communication channel to detect the at least one of: the addition of the new device, the addition of the new service, the removal of the existing device, or the removal of the existing service.*

*23. The non-transitory computer storage medium of claim 22 wherein the instructions cause the one or more processors to access the plurality of service descriptions at least by receiving one or more service descriptions from the peer device.*

*24. The non-transitory computer storage medium of claim 23 wherein the instructions cause the one or more processors to at least catalog one or more of the plurality of service descriptions corresponding to the electronic devices.*

*25. The non-transitory computer storage medium of claim 24 wherein the second device is charged for access to the information identifying the at least one additional service.*

*26. The non-transitory computer storage medium of claim 25 wherein the instructions cause the one or more processors to access the plurality of service descriptions corresponding to the electronic devices of the resource context at least by querying a service catalog accessible to the peer-to-peer network.*

*27. The non-transitory computer storage medium of claim 26 wherein the at least one additional service is software executable to cause at least the first and second electronic devices to collectively perform the aggregated function to implement a third device.*

*28. The non-transitory computer storage medium of claim 27 wherein the instructions cause the one or more processors to access the plurality of service descriptions corresponding to the electronic devices of the resource context at least by:*

*accessing the service catalog of available services for the resource context.*

*29. The non-transitory computer storage medium of claim 22, wherein the resource context includes the existing service and the at least one constellation includes the existing service.*

*30. A non-transitory computer storage medium comprising stored instructions that, when executed, cause one or more processors to at least:*

*identify, at a first device, a resource context, wherein the resource context identifies a plurality of devices that are accessible to the first device in a peer-to-peer network;*

*access a plurality of service descriptions corresponding to the devices of the resource context, a first one of the plurality of service descriptions corresponding to software that may be executed to combine functionality of at least two of the devices in the peer-to-peer network*

*to implement a second device in the peer-to-peer network, the second device having functionality different than the functionality of the at least two devices; and*

*store information identifying the software,*

*wherein the second device is implemented utilizing the software and the at least two of the devices in the peer-to-peer network, and*

*wherein the service descriptions are discoverable in response to a first request from a third device in the peer-to-peer network.*

*31. The non-transitory computer storage medium of claim 30 wherein the instructions cause the one or more processors to at least:*

*receive from the first device an indication of at least one device or service added to or removed from the peer-to-peer network; and*

*access at least one of the service descriptions corresponding to the at least one device or service added to or removed from the peer-to-peer network.*

*32. The non-transitory computer storage medium of claim 30 wherein the instructions cause the one or more processors to access the plurality of service descriptions at least by receiving one or more service descriptions from a peer device.*

*33. The non-transitory computer storage medium of claim 30 wherein the instructions cause the one or more processors to access the plurality of service descriptions at least by receiving a link to one or more service descriptions.*

*34. The non-transitory computer storage medium of claim 33 wherein the instructions cause the one or more processors to receive the link to the one or more service descriptions at least by receiving a Uniform Resource Locator (URL) or Web Service Uniform Resource Indicator (URI).*

*35. The non-transitory computer storage medium of claim 33 wherein the link is received predictively.*

*36. The non-transitory computer storage medium of claim 33 wherein the link is a link to a constellation.*

*37. The non-transitory computer storage medium of claim 30 wherein the instructions cause the one or more processors to identify the resource context at least by receiving an identification of at least one of the plurality of the devices.*

*38. The non-transitory computer storage medium of claim 30 wherein the instructions cause the one or more processors to at least transmit a response to a discovery protocol request.*

*39. The non-transitory computer storage medium of claim 38 wherein the instructions cause the one or more processors to transmit the response utilizing a Web Services protocol.*

*40. The non-transitory computer storage medium of claim 39 wherein the Web Services protocol is a tag-based markup language comprising an extensible markup language (XML), Web Services Description Language (WSDL), Simple Object Access Protocol (SOAP), or Universal Description Discovery and Integration (UDDI) protocol.*

*41. The non-transitory computer storage medium of claim 30 wherein the instructions cause the one or more processors to at least track addition and removal of devices of the resource context.*

*42. The non-transitory computer storage medium of claim 30 wherein the instructions cause the one or more processors to at least catalog one or more of the plurality of service descriptions corresponding to the devices.*

*43. The non-transitory computer storage medium of claim 30 wherein the first device is charged for access to the second device.*

*44. The non-transitory computer storage medium of claim 30 wherein the first device is charged for access to the information identifying the second device.*

*45. The non-transitory computer storage medium of claim 30 wherein the instructions cause the one or more processors to access the plurality of service descriptions corresponding to the devices of the resource context at least by querying a service catalog accessible to the peer-to-peer network.*

*46. The non-transitory computer storage medium of claim 30 wherein the first device and the third device are peer devices.*

*47. The non-transitory computer storage medium of claim 46 wherein the first device controls operation of the second device by executing the software.*

*48. The non-transitory computer storage medium of claim 30 wherein the instructions cause the one or more processors to at least:*

*utilize a supervisory pull system to automatically obtain the software to provision the at least two devices to implement the second device.*

*49. The non-transitory computer storage medium of claim 48 wherein the software defines services that are pre-written for interfaces of the resource context.*

*50. The non-transitory computer storage medium of claim 49 wherein the software is suspended, removed, or updated automatically.*

*51. The non-transitory computer storage medium of claim 30 wherein the instructions cause the one or more processors to access the plurality of service descriptions corresponding to the devices of the resource context by at least accessing a catalog of available services for the resource context.*

*52. The non-transitory computer storage medium of claim 51 wherein the instructions cause the one or more processors to access the catalog of available services in response to a real-time query.*

*53. The non-transitory computer storage medium of claim 51 wherein the accessed plurality of service descriptions includes service descriptions corresponding to devices or services that are predicted to be part of the resource context.*

*54. The non-transitory computer storage medium of claim 51 wherein the instructions cause the one or more processors to at least receive a subset of the available services for the resource context within the catalog.*

*55. The non-transitory computer storage medium of claim 30 wherein the instructions cause the one or more processors to at least:*

*store information identifying at least one predicted aggregate service.*

*56. The non-transitory computer storage medium of claim 30 wherein the instructions cause the one or more processors to at least:*

*store information identifying at least one additional aggregate service for an additional device to amalgamate two or more functions available in the peer-to-peer network.*

*57. The non-transitory computer storage medium of claim 30 wherein the instructions cause the one or more processors to at least:*

*control the second device.*

*58. The non-transitory computer storage medium of claim 30 wherein the instructions cause the one or more processors to at least:*

*receive one or more commands for controlling the second device.*

*59. The non-transitory computer storage medium of claim 30 wherein the instructions cause the one or more processors to at least:*

*transmit one or more commands for controlling the second device.*

*60. The non-transitory computer storage medium of claim 30, wherein the resource context includes at least one service and the at least one constellation includes at least one of the at least one service.*

*61. A method of identifying virtual devices to be delivered in a peer-to-peer network, the method comprising:*

*obtaining a resource context identifying a plurality of devices that are accessible to a first device in the peer-to-peer network, a first constellation of the devices to collectively implement a first virtual device and a second constellation of the devices to collectively implement a second virtual device different than the first virtual device, the first constellation different than the second constellation;*

*accessing a plurality of service descriptions corresponding to the devices, the plurality of service descriptions describing functionality of the devices; and*

*storing information identifying at least one of the first or the second virtual devices, wherein the at least one of the first or the second virtual device is constructed utilizing the accessed plurality of service descriptions, and wherein a service description for the at least one of the first or the second virtual device is discoverable in response to a first request from a second device in the peer-to-peer network.*

*62. The method of claim 61 further comprising:*

*receiving an indication of at least one device or service added to or removed from the peer-to-peer network;*

*accessing at least one service description corresponding to the at least one device or service added to or removed from the peer-to-peer network; and*

*storing a service description for at least one subsequent virtual device different from the first and the second virtual devices, wherein the at least one subsequent virtual device is constructed utilizing the at least one service description corresponding to the at least one device or service added to or removed from the peer-to-peer network, and wherein a service description for the at least one subsequent virtual device is discoverable in response to a second request from the second device in the peer-to-peer network.*

*63. The method of claim 61 wherein the accessing of the plurality of service descriptions comprises receiving one or more service descriptions from a peer device.*

*64. The method of claim 61 wherein the accessing of the plurality of service descriptions comprises receiving a link to one or more service descriptions.*

*65. The method of claim 61 wherein the identifying of the resource context comprises receiving an identification of at least one of the plurality of devices.*

*66. The method of claim 61 further comprising transmitting a response to a discovery protocol request received from the second device.*

*67. The method of claim 61 further comprising tracking the addition and removal of devices of the resource context.*

*68. The method of claim 61 further comprising cataloging the plurality of service descriptions corresponding to the devices.*

*69. The method of claim 61 wherein the second device is charged for access to the first virtual device.*

*70. The method of claim 61 wherein the second device is charged for access to the information identifying the at least one first or second virtual device.*

*71. The method of claim 61 wherein the accessing of the plurality of service descriptions corresponding to the devices of the resource context comprises querying a service catalog accessible to the peer-to-peer network.*

*72. The method of claim 61 wherein the first device and the second device are peer devices.*

*73. The method of claim 61 further comprising utilizing a supervisory pull system to automatically obtain software to provision the devices of the first constellation to implement the first virtual device.*

*74. The method of claim 73 wherein the software defines services that are pre-written for interfaces of the resource context.*

*75. The method of claim 74 wherein the software is suspended, removed, or updated automatically.*

*76. The method of claim 61 wherein the accessing of the plurality of service descriptions corresponding to the devices of the resource context comprises accessing a catalog of available services for the resource context.*

*77. The method of claim 76 wherein a real-time query is utilized for accessing the catalog of available services.*

*78. The method of claim 76 wherein the accessed plurality of service descriptions includes services descriptions corresponding to devices or services that are predicted to be part of the resource context.*

*79. The method of claim 61, wherein the resource context includes at least one service and the at least one constellation includes at least one of the at least one service.*

*80. A system for identifying aggregate services of a peer-to-peer network, the system comprising:*

*a first device of the peer-to-peer network, the first device including:*

*a memory including computer-executable instructions; and*

*a processor to execute the instructions to:*

*generate a resource context identifying a plurality of devices that are accessible to the first device in the peer-to-peer network, different combinations of the devices corresponding to different constellations, the processor to update the resource context in response to at least one of: an addition of a new device, an addition of a new service, a removal of an existing device, or a removal of an existing service; and*

*a second device including:*

*memory including computer-executable instructions; and*

*a processor to execute the instructions to:*

*obtain the resource context from the first device;*

*access a plurality of service descriptions corresponding to the devices of the resource context, the plurality of service descriptions describing functionality of the devices;*

*return information identifying a first aggregate service corresponding to a first of the constellations to the first device, wherein the first aggregate service is to provide a first virtual device via the first constellation; and*

*return information identifying a second aggregate service corresponding to a second of the constellations to the first device, the second aggregate service to provide a second virtual device via the second constellation, the second virtual device different than the first virtual device.*

*81. The system, of claim 80, wherein the resource context includes the existing service and the first constellation includes the existing service.*

*82. A system for identifying aggregate services of a peer-to-peer network, the system comprising:*

*means for identifying a resource context specifying a plurality of devices in the peer-to-peer network, different combinations of the devices corresponding to different constellations;*

*means for accessing a plurality of service descriptions corresponding to the devices of the resource context, the plurality of service descriptions describing functionality of the devices; and*

*means for storing information identifying at least one virtual device corresponding to at least one of the constellations, wherein the at least one virtual device is constructed utilizing the accessed plurality of service descriptions, and wherein the service description for the at least one virtual device is discoverable in response to a first request from a device in the peer-to-peer network.*

*83. The system of claim 82 further comprising:*

*means for tracking addition and removal of devices within the peer-to-peer network, the identifying means to update the resource context in response to the tracking means detecting at least one of: an addition of a new device to the peer-to-peer network, an addition of a new service to the peer-to-peer network, a removal of an existing device from the peer-to-peer network, or a removal of an existing service from the peer-to-peer network.*

*84. The system of claim 82, wherein the resource context includes at least one service and the at least one of the constellations includes at least one of the at least one service.*

*85. A non-transitory computer storage medium comprising stored instructions that, when executed, cause one or more processors external to a peer-to-peer network to at least:*

*access a plurality of service descriptions corresponding to a plurality of devices of a resource context, wherein the resource context at least identifies the devices that are in the peer-to-peer network, the plurality of service descriptions describe functionality of the devices;*

*identify a first aggregate service corresponding to an aggregation of the functionality of a first subset of the devices in the peer-to-peer network based on corresponding ones of the service descriptions;*

*identify a second aggregate service corresponding to an aggregation of the functionality of a second subset of the devices in the peer-to-peer network based on corresponding ones of the service descriptions; and*

*provide software to the peer-to-peer network, the software to enable at least one of the first aggregate service or the second aggregate service within the peer-to-peer network.*

*86. The non-transitory computer storage medium of claim 85 wherein the instructions cause the one or more processors to at least:*

*receive an indication of at least one device or service added to or removed from the peer-to-peer network;*

*access at least one service description corresponding to the at least one device or service added to or removed from the peer-to-peer network; and*

*store a service description for at least one subsequent aggregate service,*

*wherein the at least one subsequent aggregate service is selected utilizing the at least one service description corresponding to the at least one device or service added to or removed from the peer-to-peer network, and*

*wherein the service description for the at least one subsequent aggregate service is discoverable in response to a second request from the device in the peer-to-peer network.*

*87. The non-transitory computer storage medium of claim 85 wherein the instructions cause the one or more processors to access the plurality of service descriptions at least by receiving one or more service descriptions from a peer device.*

*88. The non-transitory computer storage medium of claim 85 wherein the instructions cause the one or more processors to access the plurality of service descriptions at least by receiving a link to one or more service descriptions.*

*89. The non-transitory computer storage medium of claim 88 wherein the instructions cause the one or more processors to receive the link to the one or more service descriptions at least by receiving a Uniform Resource Locator (URL) or Web Service Uniform Resource Indicator (URI).*

*90. The non-transitory computer storage medium of claim 88 wherein the link is received predictively.*

*91. The non-transitory computer storage medium of claim 88 wherein the link is a link to a constellation.*

*92. The non-transitory computer storage medium of claim 85 wherein the instructions cause the one or more processors to at least transmit a response to a discovery protocol request.*

*93. The non-transitory computer storage medium of claim 92 wherein the instructions cause the one or more processors to transmit the response utilizing a Web Services protocol.*

*94. The non-transitory computer storage medium of claim 93 wherein the Web Services protocol is a tag-based markup language comprising an extensible markup language (XML), Web Services Description Language (WSDL), Simple Object Access Protocol (SOAP), or Universal Description Discovery and Integration (UDDI) protocol.*

*95. The non-transitory computer storage medium of claim 85 wherein the instructions cause the one or more processors to at least track the addition and removal of devices of the resource context.*

*96. The non-transitory computer storage medium of claim 85 wherein the instructions cause the one or more processors to at least catalog one or more of the plurality of service descriptions corresponding to the devices.*

*97. The non-transitory computer storage medium of claim 85 wherein a device within the peer-to-peer network is charged for access to the at least one of the first aggregate service or the second aggregate service.*

*98. The non-transitory computer storage medium of claim 85 wherein a device within the peer-to-peer network is charged for access to the information identifying the at least one of the first aggregate service or the second aggregate service.*

*99. The non-transitory computer storage medium of claim 85 wherein the instructions cause the one or more processors to access the plurality of service descriptions corresponding to the devices of the resource context by at least querying a service catalog accessible to the peer-to-peer network.*

*100. The non-transitory computer storage medium of claim 85 wherein the first aggregate service is different than the second aggregate service.*

*101. The non-transitory computer storage medium of claim 85 wherein the instructions cause the one or more processors to access the plurality of service descriptions by at least:*

*utilizing a supervisory pull system to automatically obtain the software for the at least one of the first or the second aggregate service.*

*102. The non-transitory computer storage medium of claim 101 wherein the software defines services that are pre-written for interfaces of the resource context.*

*103. The non-transitory computer storage medium of claim 102 wherein the software for the at least one of the first or the second aggregate service is suspended, removed, or updated automatically.*

*104. The non-transitory computer storage medium of claim 85 wherein the instructions cause the one or more processors to access the plurality of service descriptions corresponding to the devices of the resource context by at least accessing a catalog of available services for the resource context.*

*105. The non-transitory computer storage medium of claim 104 wherein the instructions cause the one or more processors to access the catalog of available services in response to a real-time query.*

*106. The non-transitory computer storage medium of claim 104 wherein the accessed plurality of service descriptions includes services descriptions corresponding to devices or services that are predicted to be part of the resource context.*

*107. The non-transitory computer storage medium of claim 104 wherein the instructions cause the one or more processors to at least obtain a subset of the available services for the resource context within the catalog.*

*108. The non-transitory computer storage medium of claim 85 wherein the instructions cause the one or more processors to at least store information identifying at least one predicted aggregate service.*

*109. The non-transitory computer storage medium of claim 85 wherein the instructions cause the one or more processors to at least store information identifying at least one additional aggregate service for an additional identified constellation.*

*110. The non-transitory computer storage medium of claim 85 wherein the instructions cause the one or more processors to at least control the at least one of the first or the second aggregate service.*

*111. The non-transitory computer storage medium of claim 85 wherein the instructions cause the one or more processors to at least obtain one or more commands to control the at least one of the first or the second aggregate service.*

*112. The non-transitory computer storage medium of claim 85 wherein the instructions cause the one or more processors to at least transmit one or more commands to control the at least one of the first or the second aggregate service.*

*113. The non-transitory computer storage medium of claim 85, wherein the resource context includes at least one service accessible in the peer-to-peer network and the first virtual device utilizes the at least one service.*

*114. A method of provisioning software within a peer-to-peer network, the method comprising:*

*accessing a plurality of service descriptions corresponding to a plurality of devices of a resource context, wherein the resource context identifies the devices that are accessible to a first device in the peer-to-peer network, the plurality of service descriptions describe functionality of the devices;*

*operating one or more processors to provision the peer-to-peer network with first software to implement a first virtual device corresponding to a first constellation of two or more of the devices based on one or more of the accessed plurality of service descriptions, the two or more devices of the first constellation respectively having corresponding functionalities, the first virtual device having an aggregated functionality different from the functionalities corresponding to the two or more devices of the first constellation; and*

*operating the one or more processors to provision the peer-to-peer network with second software to implement a second virtual device corresponding to a second constellation of two or more of the devices, the two or more devices of the second constellation including a different set of the devices than the first constellation.*

*115. The method of claim 114 further comprising:*

*receiving at the first device an indication of at least one device or service added to or removed from the peer-to-peer network;*

*accessing at least one service description corresponding to the at least one device or service added to or removed from the peer-to-peer network; and*

*storing a service description for at least one subsequent aggregate service corresponding to a subsequent constellation,*

*wherein the at least one subsequent aggregate service is constructed utilizing the at least one service description corresponding to the at least one device or service added to or removed from the peer-to-peer network, and wherein the service description for the at least one subsequent aggregate service is discoverable in response to a request from a second device in the peer-to-peer network.*

*116. The method of claim 115 wherein the method further comprises transmitting a response to a discovery protocol request received from a second device.*

*117. The method of claim 116 wherein the first device is charged for access to the first virtual device.*

*118. The method of claim 116 wherein the first device is charged for access to the information identifying the first virtual device.*

*119. The method of claim 115 wherein the first device and a second device are peer devices.*

*120. The method of claim 114 wherein the accessing of the plurality of service descriptions comprises receiving one or more service descriptions from a peer device.*

*121. The method of claim 114 wherein the accessing of the plurality of service descriptions comprises receiving a link to one or more service descriptions.*

*122. The method of claim 114 wherein the method further comprises tracking the addition and removal of devices of the resource context.*

*123. The method of claim 114 wherein the method further comprises cataloging the plurality of service descriptions corresponding to the devices.*

*124. The method of claim 114 wherein the accessing of the plurality of service descriptions corresponding to the devices or services of the resource context comprises querying a service catalog accessible to the peer-to-peer network.*

*125. The method of claim 114 further comprising utilizing a supervisory pull system to automatically obtain the software to provision the first constellation.*

*126. The method of claim 125 wherein the at least one constellation defines services that are pre-written for interfaces of the resource context.*

*127. The method of claim 126 wherein the software for the first constellation is suspended, removed, or updated automatically.*

*128. The method of claim 114 wherein the accessing of the plurality of service descriptions corresponding to the devices of the resource context comprises accessing a catalog of available services for the resource context.*

*129. The method of claim 128 wherein a real-time query is utilized for accessing the catalog of available services.*

*130. The method of claim 128 wherein the accessed plurality of service descriptions includes services descriptions corresponding to devices or services that are predicted to be part of the resource context.*

*131. The method of claim 114, wherein the resource context includes at least one service and the first constellation includes at least one of the at least one service.*

*132. A first device for delivering an aggregate service to a peer-to-peer network, the first device comprising:*

*a memory including computer-executable instructions; and*

*at least one processor to execute the instructions to:*

*access a plurality of service descriptions corresponding to a plurality of devices of the peer-to-peer network, the plurality of service descriptions describing functionality of the devices;*

*deliver a first aggregate service to provision the peer-to-peer network to implement a first virtual device corresponding to a first constellation of two or more of the devices based on one or more of the accessed plurality of service descriptions, the two or more devices of the first constellation respectively having corresponding functionalities, the first virtual device having an aggregated functionality different from the functionalities corresponding to the two or more devices of the first constellation; and*

*deliver a second aggregate service to provision a second constellation to implement a second virtual device, the second constellation including a different set of the devices than the first constellation.*

*133. The first device of claim 132, wherein the first constellation includes at least one service.*

*134. A non-transitory computer storage medium comprising stored instructions that, when executed by one or more processors of a first device, cause the one or more processors to at least:*

*access a resource context identifying resources of a peer-to-peer network, wherein the resources identified by the resource context includes the first device and a plurality of devices that are accessible to the first device in the peer-to-peer network;*

*identify at least one virtual device to be constructed from a plurality of service descriptions corresponding to the resources of the resource context including at least one first service description of the first device, the first device and the plurality of the devices having corresponding functionalities, the first virtual device having an aggregated functionality different from the corresponding functionalities; and*

*transmit to a second device within the peer-to-peer network at least one request to update the at least one virtual device with the at least one first service description of the first device, wherein the at least one first service description describes functionality of devices or services accessible to the first device.*

*135. The non-transitory computer storage medium of claim 134 wherein the instructions cause the one or more processors to at least receive a response from the second device in response to the at least one request.*

*136. The non-transitory computer storage medium of claim 135 wherein the response indicates that the at least one virtual device is further constructed from the at least one first service description.*

*137. The non-transitory computer storage medium of claim 134, wherein the resource context includes at least one of the services accessible to the first device.*

*138. A method for joining a first device to an aggregate service within a peer-to-peer network, the method comprising:*

*accessing a resource context within the peer-to-peer network, wherein the resource context includes the first device and a plurality of devices that are accessible to the first device in the peer-to-peer network;*

*identifying software to provision a logical platform including the first device and at least one of the plurality of devices to implement at least one aggregated functionality within the peer-to-peer network; and*

*transmitting to a second device within the peer-to-peer network at least one request to identify the at least one first service description of the first device to identify the aggregated functionality enabled by the joining of the first device to the aggregate service.*

*139. The method of claim 138 wherein the method further comprises receiving a response from the second device in response to the at least one request.*

*140. The method of claim 139 wherein the response indicates that the at least one virtual device is further constructed from the at least one first service description.*

*141. The method of claim 138, wherein the resource context includes at least one service that is accessible to the first device within the peer-to-peer network.*

*142. A system to identify an aggregate service to be performed within a peer-to-peer network, the system comprising:*

*a memory including computer-executable instructions; and*

*one or more processors to execute the instructions to:*

*access a resource context identifying a first device added to the peer-to-peer network and a plurality of devices that are accessible to the first device in the peer-to-peer network;*

*identify at least one virtual device to be executed by the first device and the devices of the resource context; and*

*cause transmission to a second device within the peer-to-peer network at least one request to update the aggregate service with at least one first service description of the first device, wherein the at least one first service description describes functionality of the at least one virtual device.*

*143. The system of claim 142 wherein the one or more processors are to receive a response from the second device in response to the at least one request.*

*144. The system of claim 143 wherein the response indicates that the at least one virtual device is further constructed from the at least one first service description.*

*145. The system of claim 142, wherein the resource context includes at least one service that is accessible to the first device within the peer-to-peer network, and the first service description describes functionality of at least one of the at least one service.*

*146. A non-transitory computer storage medium comprising stored instructions that, when executed by one or more processors of a first device, cause the one or more processors to at least:*

*receive a resource context which identifies a plurality of devices in a peer-to-peer network;*

*identify at least one aggregate service based on the resource context, the at least one aggregate service corresponding to a plurality of service descriptions of a subset of the devices of the resource context; and*

*return executable instructions to control the subset of the devices of the resource context to collectively perform the at least one aggregate service to implement a virtual device in the peer-to-peer network.*

*147. The non-transitory computer storage medium of claim 146, wherein the resource context includes at least one service and the at least one aggregate service corresponds to at least one service description of at least one of the at least one service.*

*148. A method for controlling an aggregate service, the method comprising:*

*accessing a resource context identifying a plurality of devices in a peer-to-peer network;*

*identifying at least one aggregate service based on the resource context, wherein the at least one aggregate service corresponds to a plurality of service descriptions of a subset of the devices of the resource context; and*

*returning executable instructions to cause the subset of the devices of the resource context to collectively perform the at least one aggregate service in the peer-to-peer network.*

*149. The method of claim 148, wherein the resource context includes at least one service and the at least one aggregate service corresponds to at least one service description of at least one of the at least one service.*

*150. A system for controlling an aggregate service within a peer-to-peer network, the system comprising:*

*a memory including computer-executable instructions; and*

*one or more processors to execute the instructions to:*

*access a resource context which identifies a plurality of devices in the peer-to-peer network;*

*identify at least one aggregate service based on the resource context, the at least one aggregate service corresponding to a plurality of service descriptions of a subset of the devices of the resource context; and*

*return instructions to control the subset of the devices of the resource context to collectively perform the at least one aggregate service in the peer-to-peer network, the aggregate service to emulate a device different than the devices of the subset.*

*151. The system of claim 150, wherein the resource context includes at least one service and the at least one aggregate service corresponds to at least one service description of at least one of the at least one service.*

*152. A non-transitory computer storage medium comprising stored instructions that, when executed by one or more processors, cause the one or more processors to at least:*

*obtain information indicating at least one of a device or service change within a resource context;*

*based upon the information indicating the device or service change, determine a new constellation of a plurality of separate resources in the resource context;*

*search a catalog to determine at least one catalogued service collectively executable by the plurality of the separate resources of the new constellation to emulate a device having functionality enabled by the at least one of the device or service change; and*

*store information identifying the at least one catalogued service.*

*153. The non-transitory computer storage medium of claim 152 wherein the at least one catalogued service is a common service or popular service.*

*154. The non-transitory computer storage medium of claim 152 wherein the instructions further cause one or more processors to at least:*

*predictively obtain at least one predicted service not yet available for a second constellation; and*

*store information identifying the at least one predicted service.*

*155. The non-transitory computer storage medium of claim 152 wherein the one or more processors execute the instructions continuously.*

*156. The non-transitory computer storage medium of claim 152 wherein the catalog is dynamically generated through a real-time query.*

*157. The non-transitory computer storage medium of claim 152 wherein the instructions cause the one or more processors to at least:*

*present via a user interface the at least one catalogued service.*

*158. The non-transitory computer storage medium of claim 152 wherein the instructions cause the one or more processors to at least:*

*obtain a selection or information indicating an inspection of the at least one catalogued service.*

*159. The non-transitory computer storage medium of claim 152 wherein the at least one catalogued service includes access requirements.*

*160. The non-transitory computer storage medium of claim 159 wherein the access requirements comprise licensing terms or payment terms.*

*161. A method of service identification within a network, the method comprising:*

*receiving information indicating at least one of a device or service change within a resource context;*

*based upon the information indicating the at least one of the device or service change, determining a new constellation of a plurality of independent resources in the resource context;*

*searching a catalog to determine at least one catalogued service collectively executable by the plurality of independent resources of the new constellation to emulate a device having functionality made possible by the at least one of the device or service change; and*

*storing information identifying the at least one catalogued service.*

*162. The method of claim 161 wherein the at least one catalogued service is a common service or popular service.*

*163. The method of claim 161 wherein the method further comprises:*

*predictively obtaining at least one predicted service not yet available for a second constellation; and*

*storing information identifying the at least one predicted service.*

*164. The method of claim 161 wherein the method operates continuously.*

*165. The method of claim 161 wherein the catalog is dynamically generated through a real-time query.*

*166. The method of claim 161 wherein the method further comprises:*

*presenting via a user interface the at least one catalogued service.*

*167. The method of claim 161 wherein the method further comprises:*

*receiving a selection or information indicating an inspection of the at least one catalogued service.*

*168. The method of claim 161 wherein the at least one catalogued service includes access requirements.*

*169. The method of claim 168 wherein the access requirements comprise licensing terms or payment terms.*

*170. A system for identifying services accessible by a peer device within a network, the system comprising:*

*a memory including computer-executable instructions; and*

*one or more processors to execute the instructions to:*

*obtain a resource context identifying a plurality of peer devices or services networked in a local network;*

*obtain information indicating at least one of a device or service change within the resource context;*

*based upon the information indicating the device change, determine a constellation of a plurality of networked peer resources in the resource context;*

*search a catalog to determine at least one catalogued service collectively executable by the plurality of networked peer resources of the constellation to emulate a device having functionality not available in the local network prior to the at least one of the device or service change; and*

*store information identifying the at least one catalogued service.*

*171. The system of claim 170 wherein the catalog is dynamically generated through a real-time query.*

*172. The system of claim 170 wherein the at least one catalogued service includes access requirements.*

*173. The system of claim 172 wherein the access requirements comprise licensing terms or payment terms.*

* * * * *